(12) United States Patent
Park et al.

(10) Patent No.: US 12,542,311 B2
(45) Date of Patent: Feb. 3, 2026

(54) BATTERY MODULE AND BATTERY PACK INCLUDING THE SAME (71) Applicant: LG ENERGY SOLUTION, LTD., Seoul (KR)

(72) Inventors: Won Kyoung Park, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 521 days.

(21) Appl. No.: 18/008,082

(22) PCT Filed: Feb. 17, 2022

(86) PCT No.: PCT/KR2022/002364
§ 371 (c)(1),
(2) Date: Dec. 2, 2022

(87) PCT Pub. No.: WO2022/203210
PCT Pub. Date: Sep. 29, 2022

(65) Prior Publication Data
US 2023/0253645 A1 Aug. 10, 2023

(30) Foreign Application Priority Data
Mar. 24, 2021 (KR) .................. 10-2021-0038295

(51) Int. Cl.
*H01M 10/653* (2014.01)
*H01M 50/211* (2021.01)
*H01M 50/505* (2021.01)

(52) U.S. Cl.
CPC ....... *H01M 10/653* (2015.04); *H01M 50/211* (2021.01); *H01M 50/505* (2021.01)

(58) Field of Classification Search
CPC ............. H01M 10/653; H01M 10/613; H01M 10/625; H01M 10/647; H01M 10/6554; H01M 50/505; H01M 2220/20
See application file for complete search history.

(56) References Cited

U.S. PATENT DOCUMENTS

| | | | |
|---|---|---|---|
| 2017/0092997 A1* | 3/2017 | Fukuda | .................... G01B 7/24 |
| 2018/0287116 A1 | 10/2018 | Seo et al. | |
| 2019/0044201 A1 | 2/2019 | Jo et al. | |
| 2019/0131596 A1 | 5/2019 | Yang et al. | |
| 2019/0198952 A1 | 6/2019 | Choi et al. | |

(Continued)

FOREIGN PATENT DOCUMENTS

| | | |
|---|---|---|
| CN | 108780934 A | 11/2018 |
| CN | 109155449 A | 1/2019 |

(Continued)

*Primary Examiner* — Michael N Orlando
(74) *Attorney, Agent, or Firm* — Bryan Cave Leighton Paisner LLP (57) ABSTRACT

A battery module including: a battery cell stack including a plurality of battery cells; a housing for the battery cell stack, which has an open front surface and an open rear surface; a pair of busbar frames located on the front and rear surfaces of the battery cell stack, respectively; and a first thermal conductive resin layer located between the upper surface of the battery cell stack and the upper part of the housing; an injecting part formed on the upper part of the housing; and a first thermal conductive resin layer formed by injecting a thermal conductive resin from the injecting part toward the battery cell stack.

11 Claims, 8 Drawing Sheets

(56) References Cited

U.S. PATENT DOCUMENTS

| | | |
|---|---|---|
| 2019/0260099 A1 | 8/2019 | Ju et al. |
| 2019/0280355 A1 | 9/2019 | Kim et al. |
| 2020/0194756 A1 | 6/2020 | Chen et al. |
| 2020/0194851 A1 | 6/2020 | Seo et al. |
| 2020/0343607 A1 | 10/2020 | Kim et al. |
| 2020/0350644 A1 | 11/2020 | Cho et al. |
| 2020/0373634 A1 | 11/2020 | Choi |
| 2020/0388805 A1 | 12/2020 | Yoo et al. |
| 2020/0388891 A1 | 12/2020 | Choi et al. |
| 2020/0411924 A1 | 12/2020 | Yun |
| 2021/0028414 A1 | 1/2021 | Cho et al. |
| 2021/0151820 A1 | 5/2021 | Kim et al. |
| 2021/0320385 A1 | 10/2021 | Kim et al. |
| 2022/0037710 A1 | 2/2022 | Yoon et al. |
| 2022/0263155 A1 | 8/2022 | Kim et al. |

FOREIGN PATENT DOCUMENTS

| | | |
|---|---|---|
| CN | 109428021 A | 3/2019 |
| CN | 110915019 A | 3/2020 |
| CN | 111066173 A | 4/2020 |
| EP | 3920313 A1 | 12/2021 |
| JP | 2018530890 | 10/2018 |
| JP | 2020523774 | 8/2020 |
| JP | 2021500724 | 1/2021 |
| JP | 2021504893 | 2/2021 |
| KR | 1020180071800 A | 6/2018 |
| KR | 10-2019-0092835 A | 8/2019 |
| KR | 10-2019-0106715 A | 9/2019 |
| KR | 10-2020-0012296 A | 2/2020 |
| KR | 10-2020-0012547 A | 2/2020 |
| KR | 10-2082906 B1 | 2/2020 |
| KR | 10-2020-0030964 A | 3/2020 |
| KR | 10-2020-0080079 A | 7/2020 |
| KR | 10-2020-0099106 A | 8/2020 |
| KR | 10-2148993 B1 | 8/2020 |
| KR | 10-2021-0009914 A | 1/2021 |
| KR | 10-2021-0024892 A | 3/2021 |
| KR | 10-2293334 B1 | 8/2021 |
| WO | 2019-088625 A1 | 5/2019 |
| WO | 2019203431 A1 | 10/2019 |

* cited by examiner

BATTERY MODULE AND BATTERY PACK INCLUDING THE SAME

CROSS-REFERENCE TO RELATED APPLICATIONS

This application is a US national phase of international Application No. PCT/KR2022/002364 filed on Feb. 17, 2022, and claims the benefit of Korean Patent Application No. 10-2021-0038295 filed on Mar. 24, 2021, the contents of which are incorporated herein by reference in their entirety.

TECHNICAL FIELD

The present disclosure relates to a battery module and a battery pack including the same, and more particularly, to a battery module having improved cooling performance, and a battery pack including the same.

BACKGROUND

With increasing developments in technology and demands for mobile devices, the demand for batteries as energy sources is also increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas medium- or large-sized devices such as vehicles require high power and large capacity. Therefore, a medium- or large-sized battery module having a plurality of battery cells electrically connected to one another is used.

The medium- or large-sized battery module is preferably manufactured to have as small a size and weight as possible. Consequently, a prismatic battery, a pouch-shaped battery or the like, which can be stacked with high integration and has a small weight relative to capacity, is mainly used as a battery cell of the medium- or large-sized battery module. Meanwhile, the battery module may include a housing which houses the battery cell stack in an internal space and is open on its front and rear sides.

Figure 1:
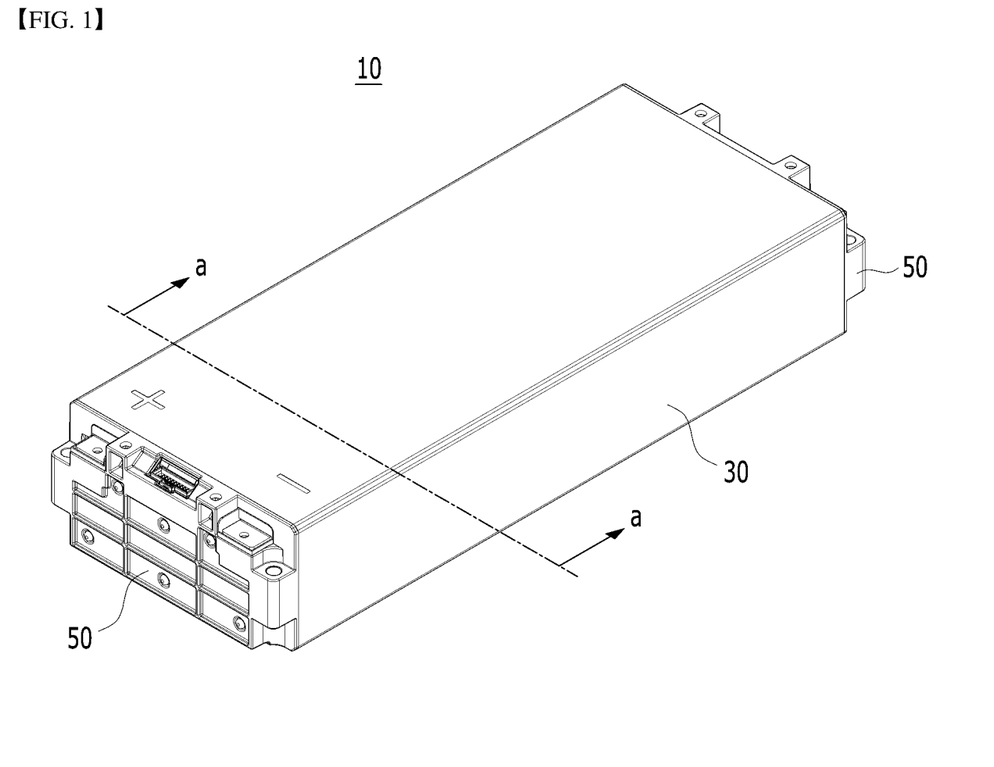
FIG. 1 is a perspective view of a conventional battery module.
Figure 2:
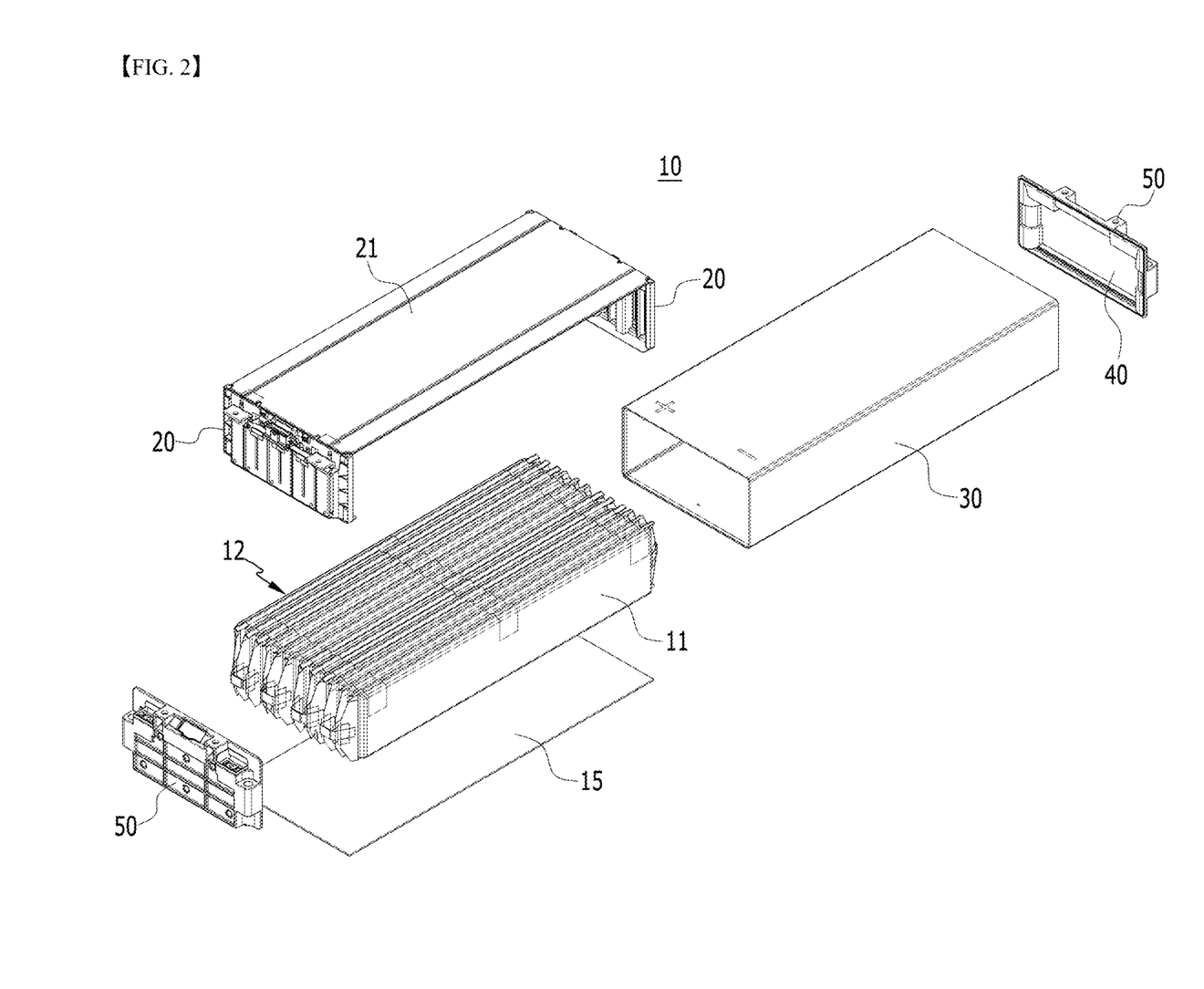
FIG. 2 is an exploded perspective view of the battery module of FIG. 1.

FIG. 1 is a perspective view of a conventional battery module. FIG. 2 is an exploded perspective view of the battery module of FIG. 1.

As illustrated in FIGS. 1 and 2, a conventional battery module 10 includes a battery cell stack 12 in which a plurality of battery cells 11 are stacked in one direction, a pair of busbar frames 20 that cover the front and rear surfaces of the battery cell stack 12, respectively, an upper plate 21 that connects the pair of busbar frames 20 at the upper end of the battery cell stack 12, a housing 30 that houses the battery cell stack 12 in a state in which the pair of busbar frames 20 and the upper plate 21 are mounted, a thermal conductive resin layer 15 that is formed between the lower surface of the battery cell stack 12 and the bottom surface of the housing 30, a pair of insulating covers 40, each of which is formed on the outside of each of the pair of busbar frames 20, and a pair of end plates 50, each of which is located on the outside of the respective insulating cover 40.

In the conventional battery module show in FIGS. 1 and 2, the battery module 10 can cool the heat generated by the battery cell stack 12, because a thermal conductive resin layer 15 is formed on the bottom surface of the housing 30 that comes into contact with the lower surface of the battery cell stack 12.

Figure 3:
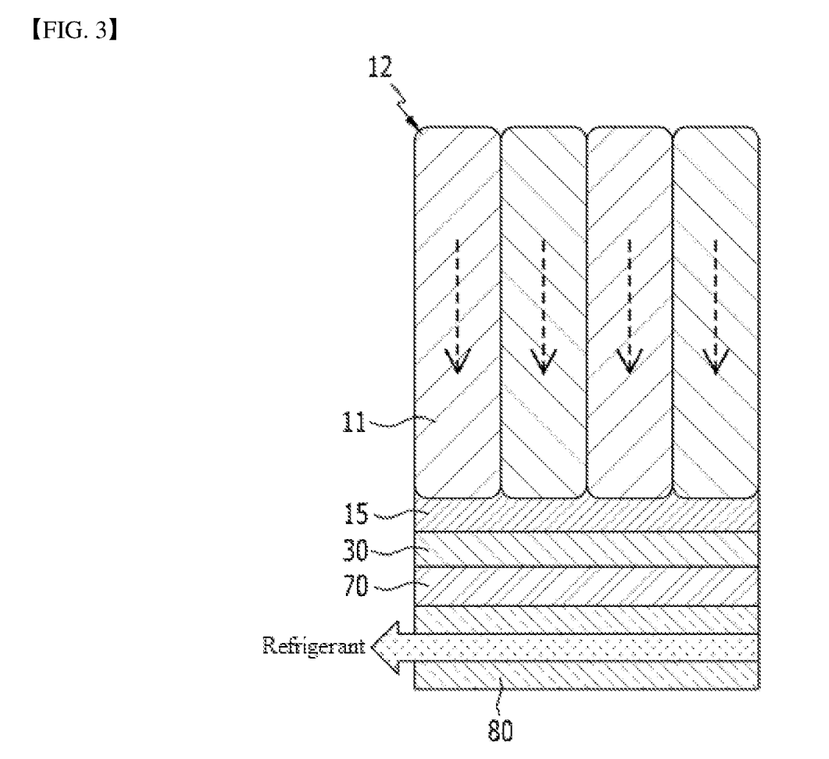
FIG. 3 is a cross-sectional view along line a-a of the battery module of FIG. 1 showing a heat transfer path when the battery module of FIG. 1 is mounted on a pack frame.

FIG. 3 is a cross-sectional view along line a-a of the battery module of FIG. 1 showing a heat transfer path when the battery module of FIG. 1 is mounted on a pack frame.

As illustrated in FIG. 3, a conventional battery module 10 has a thermal conductive resin layer 15 formed on the bottom surface of the housing 30 in contact with the lower surface of the battery cell stack 12, and thus has a structure that cools the lower part of the battery cell stack 12. However, the thermal conductive resin layer 15 is formed only at a position corresponding to the lower part of the battery cell stack 12. The portion of the battery cell 11 that is close to the thermal conductive resin layer 15 is low in temperature, and the portion of the battery cell stack 12 that is at a distance from the conductive resin layer 15 is high in temperature, which creates a temperature difference inside the battery cell 11.

Thereby, the lower surface of the battery cell stack 12 in contact with the thermal conductive resin layer 15 can be easily cooled, but the upper surface of the battery cell stack 12 at a distance from the thermal conductive resin layer 15 has a lower cooling efficiency. Particularly, considering that the temperature of the battery cells 11, and the corresponding battery cell stack 12, is one of the factors that limits the output of the battery, the local temperature rise that occurs in the battery cells 11 is highly likely to limit the output of the battery early, and thus improvement thereof is needed.

SUMMARY

It is an objective of the present disclosure to provide a battery module having a structure with improved cooling performance and a battery pack including the same.

The objectives of the present disclosure are not limited to the aforementioned objectives, and other objectives which are not described herein should be clearly understood by those skilled in the art from the following detailed description and the accompanying drawings.

According to one exemplary embodiment of the present disclosure, there is provided a battery module comprising: a battery cell stack in which a plurality of battery cells are stacked; a housing that houses the battery cell stack and is open at the front surface and the rear surface; a pair of busbar frames that are located on the front and rear surfaces of the battery cell stack; and a first thermal conductive resin layer that is located between the upper surface of the battery cell stack and the upper part of the housing, wherein an injecting part is formed on the upper part of the housing, and the first thermal conductive resin layer is formed by injecting a thermal conductive resin from the injecting part toward the battery cell stack.

The first thermal conductive resin layer may be in contact with the upper part of the housing and the upper surface of the battery cell stack, respectively.

The first thermal conductive resin layer may be located adjacent to the pair of busbar frames.

The battery module includes an upper plate that is located between the upper surface of the battery cell stack and the housing, and connects the pair of busbar frames, wherein a penetrating part is formed in the upper plate, and the injecting part is formed at a position facing the penetrating part.

The first thermal conductive resin layer may be formed inside the penetrating part by injecting a thermal conductive resin from the injecting part toward the penetrating part.

The penetrating part includes a first penetrating part and a second penetrating part, the first penetrating part is located adjacent to the front surface of the battery cell stack, and the second penetrating part is located adjacent to the rear surface of the battery cell stack.

The injecting part includes a first injecting part and a second injecting part, and the first injecting part faces the first penetrating part, and the second injecting part may face the second penetrating part.

The penetrating part includes at least two penetrating holes spaced apart from each other, the injecting part includes at least two injecting holes spaced apart from each other, and the penetrating hole and the injecting hole may face each other.

The at least two penetrating holes may extend along a longitudinal direction or a width direction of the battery cell stack.

A part of the at least two penetrating holes may be located adjacent to different edges at one end part of the upper plate.

Each of the busbar frames may be equipped with a corresponding busbar electrically connected to the battery cell stack.

A second thermal conductive resin layer may be formed between the bottom part of the housing and the lower surface of the battery cell stack.

According to another exemplary embodiment of the present disclosure, there is provided a battery pack comprising the above-mentioned battery module.

According to exemplary embodiments, the present disclosure relates to a battery module in which a thermal conductive resin layer is formed between an upper surface of a battery cell stack and a housing, thereby improving the cooling performance of the upper part of the battery cell stack, and a battery pack including the same.

The effects of the present disclosure are not limited to the effects mentioned above and additional other effects not described above will be clearly understood from the description of the appended claims by those skilled in the art.

DETAILED DESCRIPTION

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, for convenience of description, the thicknesses of some layers and regions are exaggerated for clarity.

Further, throughout the description, when a portion is referred to as "including" or "comprising" a certain component, it means that the portion can further include other components, without excluding the other components, unless otherwise stated.

Further, throughout the description, when a target portion referred to as "planar", it means the target portion is viewed from the upper side, and when a target portion is referred to as "cross-sectional", it means the target portion is viewed from the side of a cross section cut vertically.

Hereinafter, a battery module according to an exemplary embodiment of the present disclosure will be described. However, the description will be given based on the front surface of the front and back surfaces of the battery module, but is not necessarily limited thereto. Even in the case of the rear side, it will be described in the same or similar manner.

Figure 4:
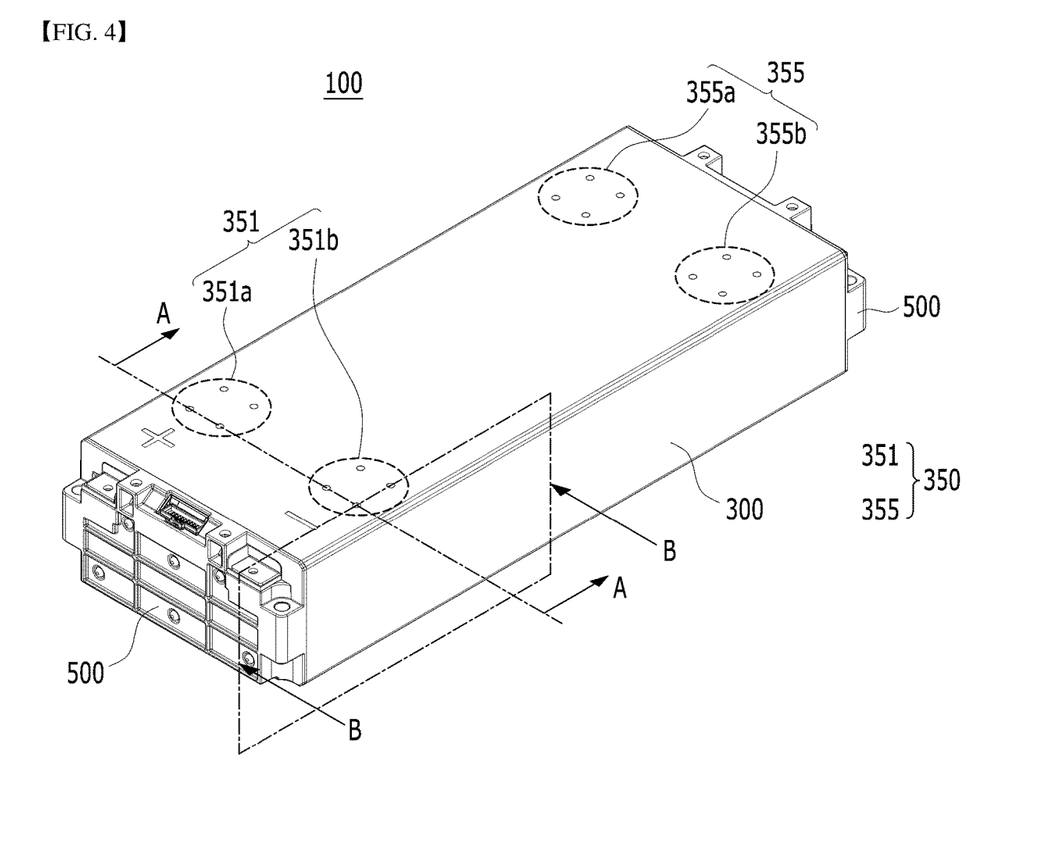
FIG. 4 is a perspective view of a battery module according to an embodiment of the present disclosure.
Figure 5:
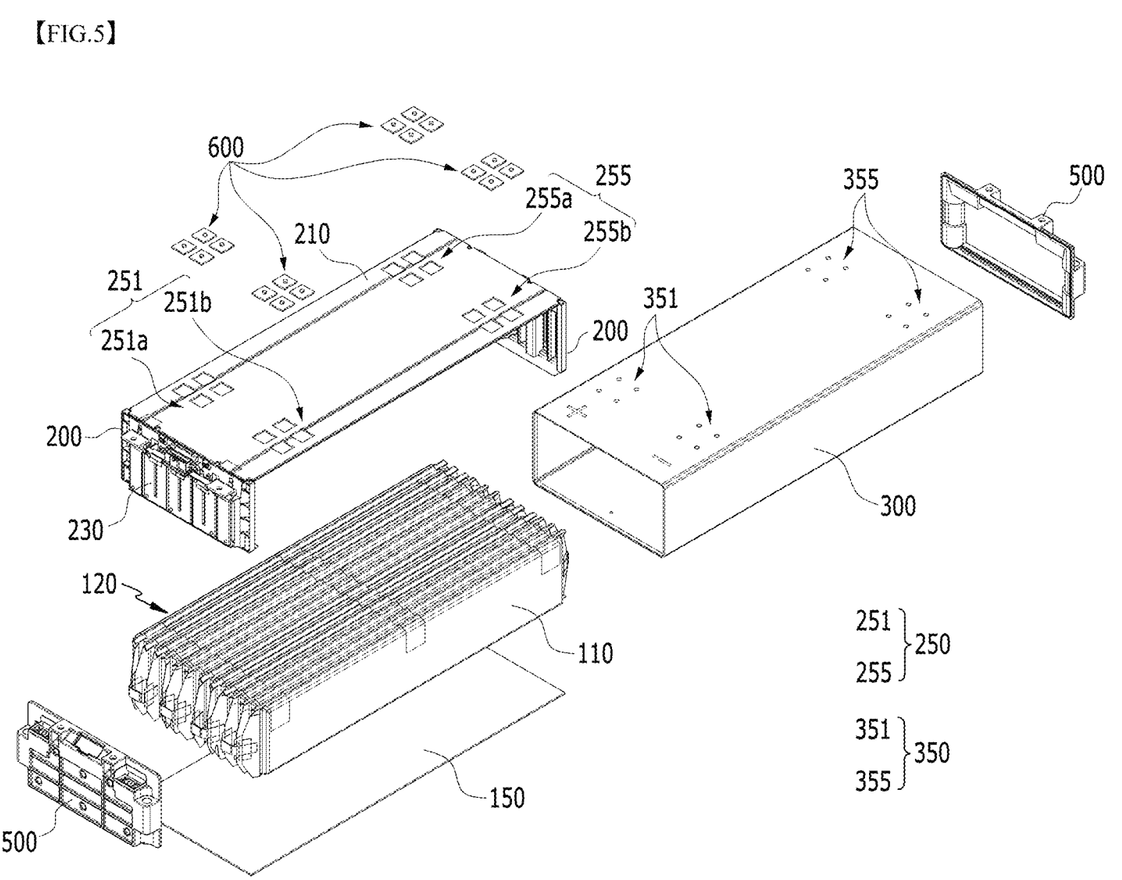
FIG. 5 is an exploded perspective view of the battery module of FIG. 4.

FIG. 4 is a perspective view of a battery module according to an exemplary embodiment of the present disclosure. FIG. 5 is an exploded perspective view of the battery module of FIG. 4.

As illustrated in FIGS. 4 and 5, the battery module 100 according to an exemplary embodiment of the present disclosure includes a battery cell stack 120 in which a plurality of battery cells 110 are stacked; a housing 300 that houses the battery cell stack 120 and is open at the front and rear surfaces; a pair of busbar frames 200 that are located on the front and rear surfaces of the battery cell stack 120, respectively; and a first thermal conductive resin layer 600 that is located between the upper surface of the battery cell stack 120 and the upper part of the housing 300.

Further, each of the busbar frames 200 may be equipped with a busbar 230 that is electrically connected to the battery cell stack 120.

Further, the battery module 100 further includes a pair of end plates 500, each of which covers the respective busbar frame 200 located on the front and rear surfaces of the battery cell stack 120. Thereby, the end plate 500 can be combined with the busbar frame 200 to protect the busbar frame 200 and various electrical components connected thereto from external impacts. Further, the terminal busbar formed in each of the busbar frames 200 can protrude to the outside through the opening formed in the respective end plate 500, thereby guiding the electrical connection between the busbar frame 200 and an external power source.

Further, an insulating member (not shown) may be located between each of the busbar frames 200 and the respective end plate 500. Thereby, the insulating member (not shown) can cover the busbar frame 200 to cut off the electrical connection between the busbar frame 200 and the outside. Further, the battery cell stack 120 is configured such that a plurality of battery cells 110 are stacked in one direction, wherein the battery cells 110 are preferably pouch-type battery cells. The battery cells 110 can be manufactured by housing the electrode assembly in a pouch case of a laminated sheet including a resin layer and a metal layer, and then heat-sealing a sealing part of the pouch case. A plurality of such battery cells 110 may be formed, and the plurality of battery cells 110 can be laminated to be electrically connected to each other to form a battery cell stack 120.

Further, the housing 300 may be a mono frame that houses the battery cell stack 120 and has an open front surface and an open rear surface. However, the housing 300 is not limited thereto, and may be replaced with a frame having another shape such as an L-shaped frame or a U-shaped frame and an upper plate.

Further, the second thermal conductive resin layer 150 may be formed between the bottom part of the housing 300 and the lower surface of the battery cell stack 120. In other words, the second thermal conductive resin layer 150 can be formed by applying a thermal conductive resin on the bottom part of the housing 300.

In one example, the second thermal conductive resin layer 150 may be formed by attaching a heat transfer pad. In another example, before the battery cell stack 120 is mounted on the bottom surface of the housing 300, the second thermal conductive resin layer 150 may have a thermal conductive resin applied to the bottom surface of the housing 300. Alternatively, in a state in which the thermal conductive resin is applied to the bottom surface of the battery cell stack 120, the battery cell stack 120 may be mounted on the housing 300. Then, as the thermal conductive resin is cured, the second thermal conductive resin layer 150 can be formed.

Thereby, the second thermal conductive resin layer 150 transfers the heat generated in the battery cell stack 120 to the bottom of the battery module 100, and fixes the battery cell stack 120 by the adhesive force of the second thermal conductive resin layer 15 itself.

In the following, the upper plate 210 and the housing 300 will be mainly described.

As illustrated in FIGS. 4 and 5, the upper plate 210 may be located between the upper surface of the battery cell stack 120 and the housing 300. Further, the upper plate 210 may be connected to the pair of busbar frames 200 located on the front and rear surfaces of the battery cell stack 120. In one example, the upper plate 210 and the busbar frames 200 are manufactured integrally with each other, or may be connected to each other by a joining method in which the end part of the upper plate 210 and the end part of each of the pair of busbar frames 200 are welded to each other.

Further, the upper plate 210 may include a penetrating part 250. More specifically, in the upper plate 210, the penetrating part 250 may be formed to penetrate from the upper surface of the battery cell stack 120 toward the upper part of the housing 300.

Further, the upper part of the housing 300 may include an injecting part 350. More specifically, in the upper part of the housing 300, the injecting part 350 may be formed to penetrate from the upper part of the housing 300 toward the upper plate 210. Here, the injecting part 350 may be formed at a position facing the penetrating part 250.

Thereby, in the present embodiment, the thermal conductive resin is injected from the injecting part 350 toward the penetrating part 250, and the first thermal conductive resin layer 600 may be formed inside the penetrating part 250.

In addition, the penetrating part 250 can adjust the region where the first thermal conductive resin layer 600 can be formed, and can prevent the thermal conductive resin injected from the injecting part 350 from being injected into an unnecessary region. Further, the penetrating part 250 may reduce the cost loss for the thermal conductive resin injected to a region where the thermal conductive resin is unnecessary.

In one example, in the upper part of the housing 300, the injecting part 350 may be formed at a position facing the center of the penetrating part 250. However, the position of the injecting part 350 is not limited thereto, and any position where the thermal conductive resin can be injected from the injection part 350 toward the penetrating part 250 is applicable.

Further, the first thermal conductive resin layer 600 may be in contact with the upper part of the housing 300 and the upper surface of the battery cell stack 120, respectively. More specifically, the first thermal conductive resin layer 600 is located inside the penetrating part 250 and may be in contact with the upper surface of the battery cell stack 120 in contact with an open surface of the penetrating part 250, and may be in contact with the upper part of the housing 300 in contact with the other open surface of the penetrating part 250.

Thereby, the first thermal conductive resin layer 600 may transfer the heat generated from the upper surface of the battery cell stack 120 toward the housing 300, and the cooling performance of the upper surface of the battery cell stack 120 may be further improved.

In one example, the first thermal conductive resin layer 600 is formed by a thermal conductive resin injected into the injecting part 350, and the thermal conductive resin may be in the form of a resin or paste. However, the present disclosure is not limited thereto, and any shape that can be injected into the penetrating part 250 through the injecting part 350 is applicable.

Further, according to an exemplary embodiment of the present disclosure, the penetrating part 250 includes a first penetrating part 251 and a second penetrating part 255, the first penetrating part 251 may be located adjacent to one end part of the upper plate 210, and the second penetrating part 255 may be located adjacent to the other end part of the upper plate 210. More specifically, in the upper plate 210, the first penetrating part 251 is located adjacent to the front surface of the battery cell stack 120, and the second penetrating part 255 may be located adjacent to the rear surface of the battery cell stack 120.

Further, the injecting part 350 includes a first injection part 351 and a second injecting part 355, the first injection part 351 may face the first penetrating part 251, and the second injecting part 355 may face the second penetrating part 255.

Thereby, in the present embodiment, the thermal conductive resin is injected from the first injecting part 351 through the first penetrating part 251, and the first thermal conductive resin layer 600 may be formed inside the first penetrating part 251, and the second injecting part 355 and the second penetrating part 255 may be described similarly.

In particular, the first thermal conductive resin layer 600 formed by the first penetrating part 251 and the first injecting part 351 and the second penetrating part 255 and the second injecting part 355 may be formed adjacent to each of the two end parts with reference to the upper surface of the battery cell stack 120. In other words, the first thermal conductive resin layer 600 formed by the first penetrating part 251 and the first injecting part 351 and the second penetrating part 255 and the second injecting part 355 may be respectively located adjacent to the corresponding busbar frame 200.

Generally, both end parts of the battery cell 110 included in the battery cell stack 120, where the positive electrode and the negative electrode are located, generate relatively more heat than the central part during the charging/discharging process of the battery module 100.

Here, the battery module 100 of the present embodiment can effectively cool the heat generated from both end parts of the battery cell stack 120 during the charging/discharging process of the battery module 100 because the first thermal conductive resin layer 600 is formed adjacent to each of the two end parts of the battery cell stack 120.

Further, according to an embodiment of the present disclosure, the penetrating part 250 includes at least two penetrating holes that are spaced apart from each other. In one example, the first penetrating part 251 includes a first penetrating hole 251a and a second penetrating hole 251b that are spaced apart from each other, and the second penetrating part 255 may include a first penetrating hole 255a and a second penetrating hole 255b that are spaced apart from each other. More specifically, as shown in FIG. 5, each of the first penetrating holes 251a and 255a and the second penetrating holes 251b and 255b may have a structure in which four penetrating holes are arranged in a frame-like structure.

Figure 8:
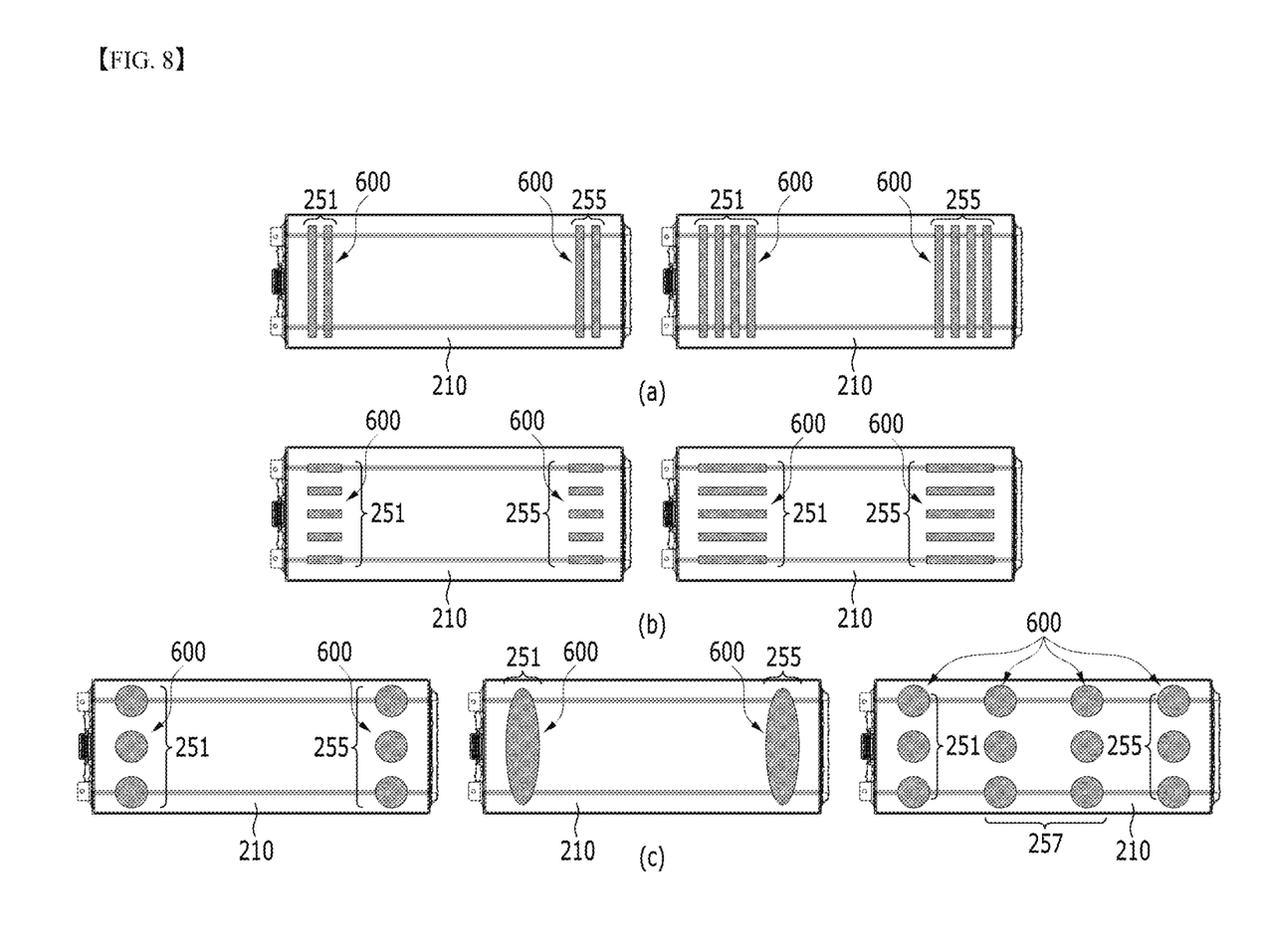
FIGS. 8A-8C are top views of the battery module according to another embodiment of the present disclosure when the housing is omitted from the battery module.

However, the shapes of the first penetrating holes 251a and 255a and the second penetrating holes 251b and 255b are not limited thereto, and may have appropriate shapes as needed as shown in FIGS. 8A-8C.

Further, the injecting part 350 includes at least two injection holes spaced apart from each other, and the injection holes may mutually face the penetrating holes. In one example, the first injecting part 351 includes a first injecting hole 351a and a second injecting hole 351b that are spaced apart from each other, and the second injecting part 355 may include a first injecting hole 355a and a second injecting hole 355b that are spaced apart from each other. More specifically, as shown in FIGS. 4 and 5, the first injecting holes 351a and 355a and the second injecting holes 351b and 355b may each have a structure in which four injecting holes are arranged in a 2*2 structure.

However, the positions of the first injecting holes 351a and 355a and the second injecting holes 351b and 355b are not limited thereto, and if necessary, they may be formed at appropriate positions to face the first penetrating holes 251a and 255a and the second penetrating holes 251b and 255b, respectively, similar to the arrangements shown in FIGS. 8A-8C.

Further, the first penetrating holes 251a and 255a and the second penetrating holes 251b and 255b may be located adjacent to different edges at one end part of the upper plate 210. More specifically, in the first penetrating part 251, the first penetrating hole 251a and the second penetrating hole 251b are located adjacent to the front surface of the battery cell stack 120, and the first penetrating hole 251a is located adjacent to one edge of the upper plate 210, and the second penetrating hole 251b is located adjacent to the other edge of the upper plate 210. The second penetrating part 255 may be described similarly.

In particular, the first thermal conductive resin layers 600 formed by the first penetrating holes 251a and 255a and the first injecting holes 351a and 355a, and the second penetrating holes 251b and 255b and the second injecting holes 351b and 355b may be formed adjacent to the edges of each of the two end parts with reference to the upper surface of the battery cell stack 120. In other words, the first thermal conductive resin layers 600 formed by the first penetrating holes 251a and 255a and the first injecting holes 351a and 355a, and the second penetrating holes 251b and 255b and the second injecting holes 351b and 355b may be located adjacent to both side parts of the respective busbar frames 200.

Generally, terminal busbars are mounted on both side parts of each of the busbar frames 200, and the terminal busbars are exposed to the outside of the battery module 100, so that an external device or circuit and the battery cells 110 can be electrically connected. However, during rapid charging of the battery module 100, the portion in which the terminal busbars are exposed to the outside can show a relatively large degree of heat generation.

The battery module 100 of the present embodiment can effectively cool the heat generated by the terminal busbars during rapid charging of the battery module 100, because the first thermal conductive resin layer 600 is formed adjacent to both side parts of each of the busbar frames 200.

Figure 6:
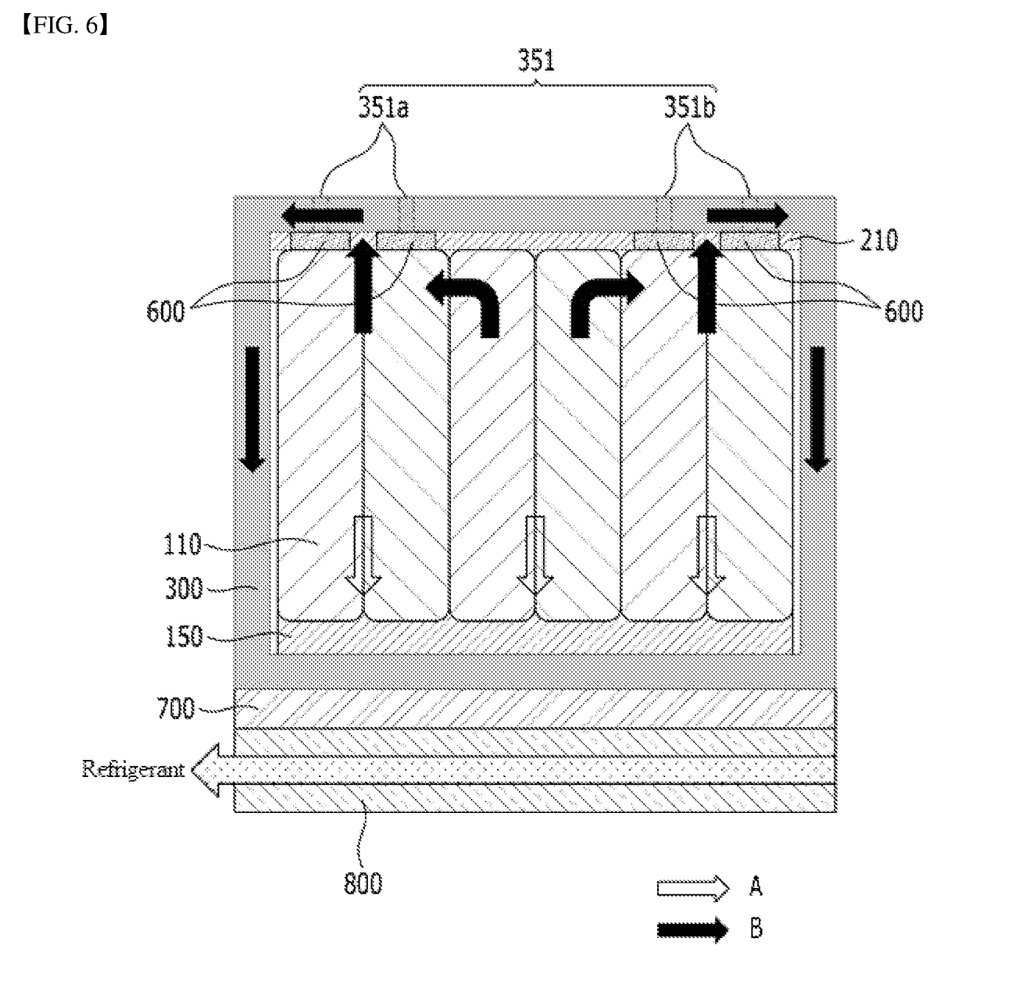
FIG. 6 is a cross-sectional view along line A-A of the battery module of FIG. 4 showing a heat transfer path when the battery module of FIG. 4 is mounted on a pack frame.
Figure 7:
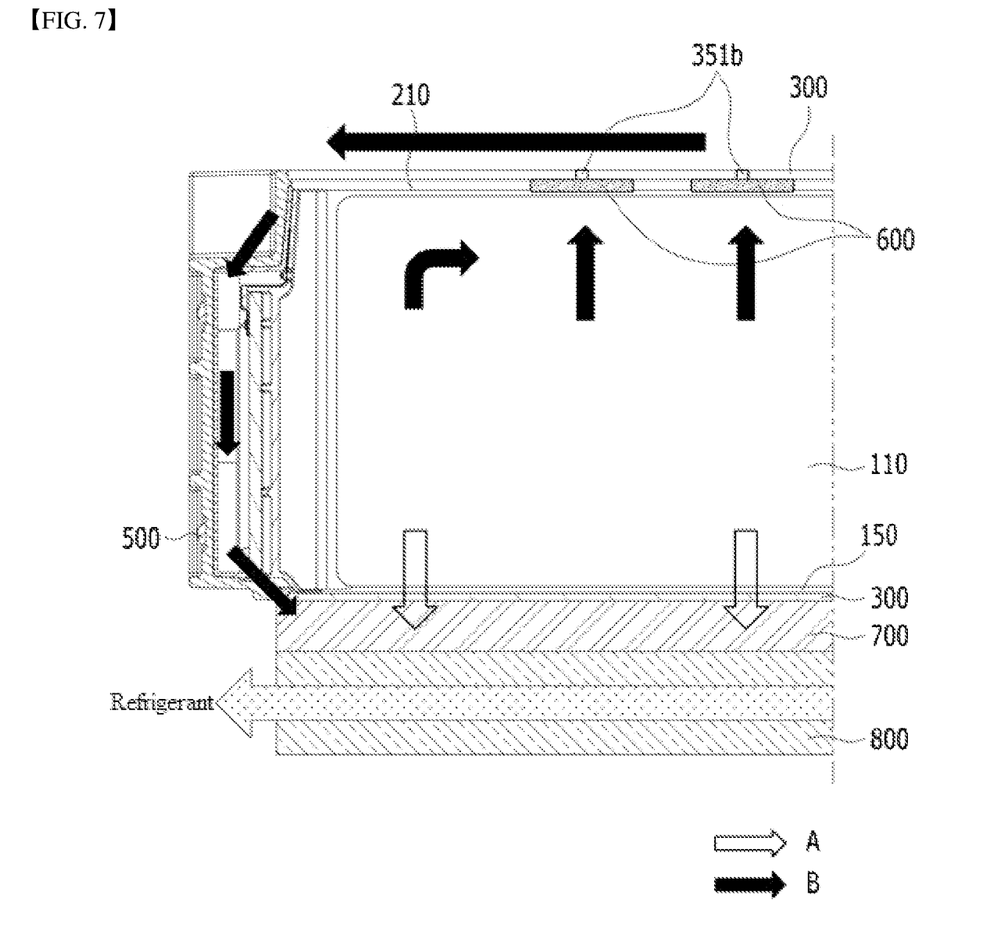
FIG. 7 is another cross-sectional view along line B-B of the battery module of FIG. 4 showing a heat transfer path when the battery module of FIG. 4 is mounted on a pack frame.

FIG. 6 is a cross-sectional view along line A-A of the battery module of FIG. 4 showing a heat transfer path when the battery module of FIG. 4 is mounted on a pack frame. FIG. 7 is another cross-sectional view along line B-B of the battery module of FIG. 4 showing a heat transfer path when the battery module of FIG. 4 is mounted on a pack frame.

As illustrated in FIGS. 6 and 7, the heat generated in the lower portion of the battery cell stack 120 during the charging/discharging process of the battery module 100 according to the present embodiment can be cooled through the first path A by transferring heat toward the second thermal conductive resin layer 150. More specifically, in the first path A, the heat transferred toward the second thermal conductive resin layer 150 may be transferred to a thermal transfer pad 700, which is one component of the battery pack, and the heat transferred to the heat transfer pad 700 may be transferred to the heat sink 800 and cooled.

In addition, the heat generated in the upper part of the battery cell stack 120 may be cooled through the second path B by transferring heat toward the first thermal conductive resin layer 600. More specifically, in the second path B, the heat transferred to the first thermal conductive resin layer 600 may be transferred to the upper part of the housing 300. Then, the heat transferred to the upper part of the housing 300 moves along the side surfaces or end plates 500 of the housing 300, and may be transferred to the heat transfer pad 700 and the heat sink 800, which are components of the battery pack located on the lower part of the housing 300.

Thereby, the battery module 100 has a structure that cools both the upper and lower portions of the battery cell stack 120, unlike the conventional battery module 10, and the heat generated in the battery cell stack 120 may be transferred through the first path A and the second path B toward both the upper part and the lower part.

In particular, as described above, the first thermal conductive resin layer 600 is located adjacent to each of the two end parts of the battery cell stack 120 or adjacent to both side parts of the busbar frames 200, if necessary, whereby it is possible to more effectively suppress the local temperature rise of the battery cell stack 120 and prevent the output of the battery including the battery cell 110 from being limited at an early stage.

FIGS. 8A-8C are top views of the battery module according to another exemplary embodiment of the present disclosure where the housing is omitted from the battery module.

As illustrated in FIGS. 8A-8C, the penetrating part 250 in the upper plate 210 includes a first penetrating part 251 and a second penetrating part 255, and the first penetrating part 251 is mainly described, and the second penetrating part 255 may be described similarly. However, the present disclosure is not limited thereto, and the first penetrating part 251 and the second penetrating part 255 may have different shapes.

For example, as illustrated in FIGS. 5 and 8A, the first penetrating part 251 may include at least two penetrating holes spaced apart from each other, and the penetrating hole may have a rectangular shape. In particular, the at least two penetrating holes may extend along the width direction of the battery cell stack 120. More specifically, the at least two penetrating holes of the first penetrating part 251 may extend along the stacking direction of the battery cell stack 120.

Thereby, the first thermal conductive resin layer 600 formed by the first penetrating part 251 and the second penetrating part 255 of FIG. 8A can be efficiently cooled with reference to both end parts of the upper surface of the battery cell stack 120.

In another example, as illustrated in FIGS. 5 and 8B, the first penetrating part 251 may include at least two penetrating holes spaced apart from each other, and the penetrating hole may have a rectangular shape. In particular, the at least two penetrating holes of the first penetrating part 251 may extend along the longitudinal direction of the battery cell stack 120.

Thereby, the first penetrating part 251 and the second penetrating part 255 of FIG. 8B extend along the longitudinal direction of the battery cell stack 120, and the first thermal conductive resin layer 600 formed by the first penetrating part 251 and the second penetrating part 255 extends along the upper surface of the battery cell, which is advantageous in that the upper surface of the battery cell 110 can be efficiently cooled.

In another example, as illustrated in FIGS. 5 and 8C, the first penetrating part 251 may include at least one penetrating hole, and the penetrating hole may have a circular or elliptical shape. In particular, the at least one penetrating hole is located adjacent to each of the two end parts of the battery cell stack 120, or may also include a third penetrating part 257 located between the first penetrating part 251 and the second penetrating part 255.

Thereby, the first penetrating part 251 and the second penetrating part 255 of FIG. 8C include a penetrating hole having a circular shape, whereby the area of the first thermal conductive resin layer 600 can be formed to be relatively large while the manufacturing method is relatively easy, which is advantageous in that the upper surface of the battery cell 110 can be efficiently cooled.

One or more battery modules according to the present embodiment can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and a battery pack including the same, which also falls under the scope of the present disclosure.

Although preferred embodiments of the invention have been shown and described above, the scope of the present disclosure is not limited thereto, and numerous changes and modifications can be devised by those skilled in the art using the principles of the invention defined in the appended claims, which also falls within the spirit and scope of the present disclosure.

The invention claimed is:

1. A battery module comprising:
   a battery cell stack comprising a plurality of battery cells;
   a housing for the battery cell stack, wherein the housing has an open front surface and an open rear surface;
   each of a pair of busbar frames on a front surface and a rear surface of the battery cell stack, respectively;
   an upper plate between an upper surface of the battery cell stack and an upper part of the housing;
   a penetrating part in the upper plate;
   a first thermal conductive resin layer between the upper surface of the battery cell stack and the upper part of the housing,
   an injecting part on the upper part of the housing at a position facing the penetrating part,
   wherein the first thermal conductive resin layer is formed by injecting a thermal conductive resin from the injecting part toward the battery cell stack, and
   wherein the first thermal conductive resin layer is inside the penetrating part and is in contact with the upper surface of the battery cell stack at one open surface of the penetrating part and in contact with the upper part of the housing at another open surface of the penetrating part.

2. The battery module of claim 1, wherein:
   the first thermal conductive resin layer is adjacent to each of the pair of busbar frames.

3. The battery module of claim 1, wherein:
   the first thermal conductive resin layer is formed inside the penetrating part by injecting the thermal conductive resin from the injecting part toward the penetrating part.

4. The battery module of claim 1, wherein:
   the penetrating part comprises a first penetrating part and a second penetrating part,
   the first penetrating part is adjacent to the front surface of the battery cell stack, and
   the second penetrating part is adjacent to the rear surface of the battery cell stack.

5. The battery module of claim 4, wherein:
   the injecting part comprises a first injecting part and a second injecting part, and
   the first injecting part faces the first penetrating part, and the second injecting part faces the second penetrating part.

6. The battery module of claim 1, wherein:
   the penetrating part comprises at least two penetrating holes spaced apart from each other,
   the injecting part comprises at least two injecting holes spaced apart from each other, and
   each of the at least two penetrating holes and each of the at least two injecting holes face each other.

7. The battery module of claim 6, wherein:
   the at least two penetrating holes extend along a longitudinal direction or a width direction of the battery cell stack.

8. The battery module of claim 7, wherein:
   a number of the at least two penetrating holes are adjacent to different edges at one end part of the upper plate.

9. The battery module of claim 1, wherein:
   each of the busbar frames is equipped with a busbar electrically connected to the battery cell stack.

10. The battery module of claim 1, further comprising:
    a second thermal conductive resin layer between the bottom part of the housing and the lower surface of the battery cell stack.

11. A battery pack comprising the battery module of claim 1.

* * * * *